United States Patent
Dragomir et al.

(10) Patent No.: US 9,280,651 B2
(45) Date of Patent: Mar. 8, 2016

(54) SECURELY HANDLING SERVER CERTIFICATE ERRORS IN SYNCHRONIZATION COMMUNICATION

(75) Inventors: Adrian Dragomir, Bellevue, WA (US); Anish Desai, Bellevue, WA (US); Robert St. Pierre, Redmond, WA (US); Marc McClure, Seattle, WA (US); Kevin Grey, Bellevue, WA (US); Jianping Yin, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

(21) Appl. No.: 13/608,967

(22) Filed: Sep. 10, 2012

(65) Prior Publication Data
US 2014/0075185 A1 Mar. 13, 2014

(51) Int. Cl.
- *H04L 29/06* (2006.01)
- *G06F 21/33* (2013.01)
- *H04L 9/32* (2006.01)

(52) U.S. Cl.
CPC .............. *G06F 21/33* (2013.01); *H04L 9/3268* (2013.01); *H04L 63/0823* (2013.01)

(58) Field of Classification Search
CPC ............................... H04L 9/3268; G06F 21/33
USPC ....................................................... 713/156
See application file for complete search history.

(56) References Cited

U.S. PATENT DOCUMENTS

| | | | |
|---|---|---|---|
| 6,865,671 B1 | 3/2005 | Assmann | |
| 7,120,929 B2 | 10/2006 | Beattie et al. | |
| 7,502,924 B2 | 3/2009 | Miller et al. | |
| 7,584,505 B2 * | 9/2009 | Mondri et al. | 726/13 |
| 7,882,204 B2 | 2/2011 | McLoughlin | |
| 8,108,917 B2 | 1/2012 | Miyazawa | |
| 2007/0136801 A1 | 6/2007 | Le et al. | |
| 2007/0143596 A1 | 6/2007 | Myers et al. | |
| 2007/0180225 A1 | 8/2007 | Schmidt | |
| 2009/0228986 A1 * | 9/2009 | Adler et al. | 726/26 |
| 2010/0083347 A1 | 4/2010 | Hinton | |
| 2011/0116637 A1 * | 5/2011 | Schiefelbein | 380/286 |

OTHER PUBLICATIONS

Certificate Authority, Wikipedia, visited Aug. 29, 2012, 4 pages.
Anderson, "Windows Phone, Exchange, and self-signed certificates," Tim Anderson's ITWriting: Tech Writing Blog, Nov. 28, 2011, 3 pages.
HP Palm Support: "SSL Error: No trusted root. Update certificate authority list. (when using VersaMail 3.5)," Support Knowledgebase, http://kb.hpwebos.com/wps/portal/kb/common/article/16733_en.htm, archived Mar. 17, 2012, 3 pages.
Elenkov, "Using a Custom Certificate Trust Store on Android," http://nelenkov.blogspot.de/2011/12/using-custom-certificate-trust-store-on.html, Dec. 28, 2011, 18 pages.

(Continued)

*Primary Examiner* — Longbit Chai
(74) *Attorney, Agent, or Firm* — Judy Yee; Micky Minhas

(57) ABSTRACT

An invalid digital certificate can be saved and subsequently compared to an incoming digital certificate when performing a security check. If a subsequently provided digital certificate does not match the saved digital certificate, an error condition can be generated. Because a digital certificate can be invalid for non-malicious reasons, such technologies can be useful for improving software security.

19 Claims, 13 Drawing Sheets

(56) References Cited

OTHER PUBLICATIONS

Leeland, "No more 'unable to find valid certification path to requested target,'" http://nodsw.com/blog/leeland/2006/12/16-no-more-unable-find-valid-certification-path-requested-target, Dec. 6, 2006, 6 pages.

Stack Overflow: "How to handle invalid SSL certificates with Apache HttpClient?," http://stackeroverflow.com/questions/1828775/how-to-handle-invalid-ssl-certificates-with-apache-httpclient, May 2, 2012, 6 pages.

Djigzo, "Djigzo for Android Reference Guide," Djigzo web site, May 30, 2012, 32 pages.

International Search Report and Written Opinion issued in corresponding PCT Application No. PCT/US2013/057425, dated Nov. 20, 2013, 11 pages.

Djigzo, "Djigzo for Android Reference Guide," Djigzo web site, Mar. 11, 2012, 32 pages.

* cited by examiner

SECURELY HANDLING SERVER CERTIFICATE ERRORS IN SYNCHRONIZATION COMMUNICATION

BACKGROUND

Software security is an important part of computing technology, but it is difficult to understand and often overlooked by casual users. For example, digital certificates are a useful technology for establishing the identity of computers. However, an ordinary user of a computing device typically is not interested in the details of how digital certificates work.

Digital certificates can be issued by a certificate authority. If the certificate authority is well known and trusted, then certificates issued by the trusted authority that establish the identity of a computer can be trusted.

However, it is sometimes the case that a certificate is invalid for any of a variety of reasons. For example, a small business or hobbyist user may wish to forgo the expense of obtaining a digital certificate from a well-known authority and issue their own certificate, use an expired certificate, or the like.

As a result, such certificates may be deemed invalid and cause errors. A user will typically either stop using the computing device or ignore the error. Therefore, there remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Invalid digital certificate processing can be used to establish identity of a synchronization server, even though the digital certificate is invalid.

An indication that synchronization server digital certificate invalidity is to be ignored can be received, and a (first) digital certificate can be saved via a persisted invalid synchronization server digital certificate identifier.

Subsequently (e.g., during subsequent syncing), if it is detected that an incoming synchronization server digital certificate does not match the first digital certificate, an error condition can be generated.

As described herein, a variety of other features and advantages can be incorporated into the technologies as desired.

DETAILED DESCRIPTION

Example 1

Exemplary Overview

The technologies described herein can be used for a variety of invalid digital certificate processing scenarios. Adoption of the technologies can provide secure techniques for processing such certificates. The methods and systems can establish the identity of a synchronization server, even when digital certificates are found to be invalid.

Small business and hobbyist users can take advantage of the technologies to provide a measure of synchronization security without having to expend the cost and effort to obtain a digital certificate signed by a well-known certificate authority.

The technologies can be helpful for those wishing to provide end users with more intelligent processing of digital certificate errors. Beneficiaries can include those operating servers with invalid certificates. End users can also benefit from the technologies because attacks against their devices can be avoided.

Example 2

Exemplary System Implementing Invalid Digital Certificate Processing

Figure 1:
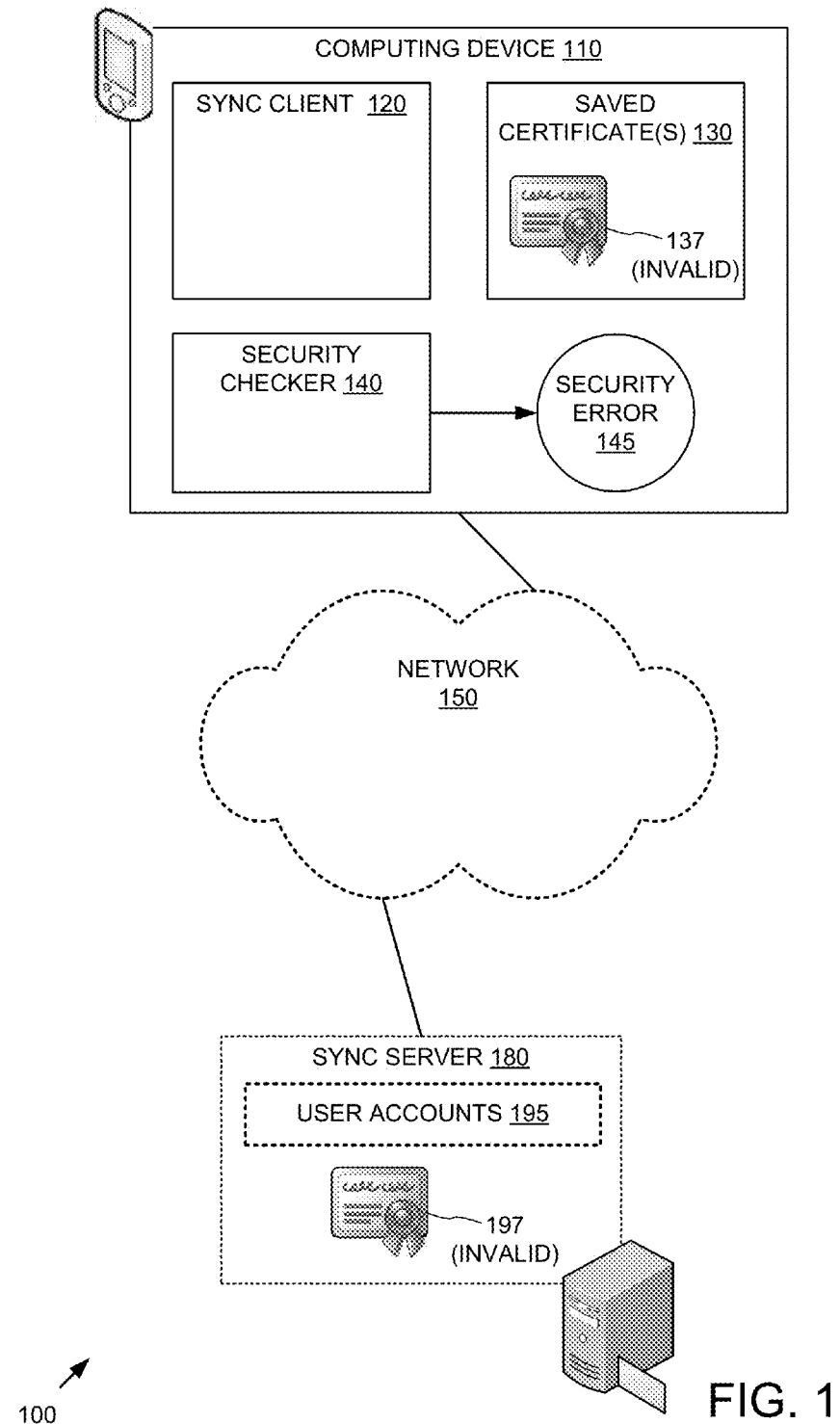
FIG. 1 is a block diagram of an exemplary system implementing invalid digital certificate processing in synchronization communication.

FIG. 1 is a block diagram of an exemplary system 100 implementing invalid digital certificate processing as described herein.

For purposes of context, the diagram shows a synchronization server 180 that provides access to user information (e.g., email, contacts, calendar information, tasks, or the like) in user accounts 195. In the example, the synchronization server 180 provides an invalid digital certificate 197 to establish its identity. The server 180 is typically accessed via a network 150 by the computing device 110, which can be any computing system described herein, including mobile computing devices, and the like.

The computing device 110 can include a synchronization client 120 for accessing user information on the synchronization server 180, and saved digital certificate storage 130, which is configured to persist one or more persisted invalid server digital certificate identifiers (e.g., in computer-readable media) 137 for respective servers. The certificate storage 130 can indicate with which server a particular saved digital certificate is associated (e.g., by associating a certificate identifier with the server name). Certificates can be saved and organized in any of a variety of ways. For example, they can be stored by server name (e.g., to be retrieved later by specifying a server name), synchronization account, or the like. As described herein, more than one certificate can be saved per synchronization account.

In practice, saving a certificate need not persist a complete copy of the certificate. Instead a certificate identifier can be used. While the identifier can be the complete certificate, a portion of the certificate, a digital digest, cryptographic hash, thumbprint, or other indicating information can be persisted as a certificate identifier so that it is virtually impossible for two certificates to have the same identifier and not be identical.

A security checker 140 can be configured to receive a subsequent incoming server digital certificate indicated as from a server. The checker 140 can generate a security error 145 responsive to determining that the subsequent incoming server digital certificate does not match the saved invalid server digital certificate (e.g., represented by an identifier stored in the certificate storage 130) for the server. As described herein, the checker 140 can be further configured to inhibit syncing by the synchronization client 120 responsive to determining that a subsequent incoming digital certificate does not match a persisted digital certificate identifier 137 for a server. An error message can be displayed as described herein.

Although the synchronization client 120, saved certificate storage 130, and security checker 140 are shown in separate boxes, in practice, component boundaries may vary. For example, the certificate storage 130 and the security checker 140 can be implemented as part of the synchronization client 120. Other arrangements are possible while still implementing the technologies.

In practice, the systems shown herein, such as system 100 can be more complicated, with additional functionality, more servers, and the like.

The system 100 and any of the other systems described herein can be implemented in conjunction with any of the hardware components described herein, such as the computing systems described below (e.g., processing units, memory, and the like). In any of the examples herein, the inputs, outputs, and tools can be stored in one or more computer-readable storage media or computer-readable storage devices. The technologies described herein can be generic to the specifics of operating systems or hardware and can be applied in any variety of environments to take advantage of the described features.

Example 3

Exemplary Method Implementing Invalid Digital Certificate Processing

Figure 2:
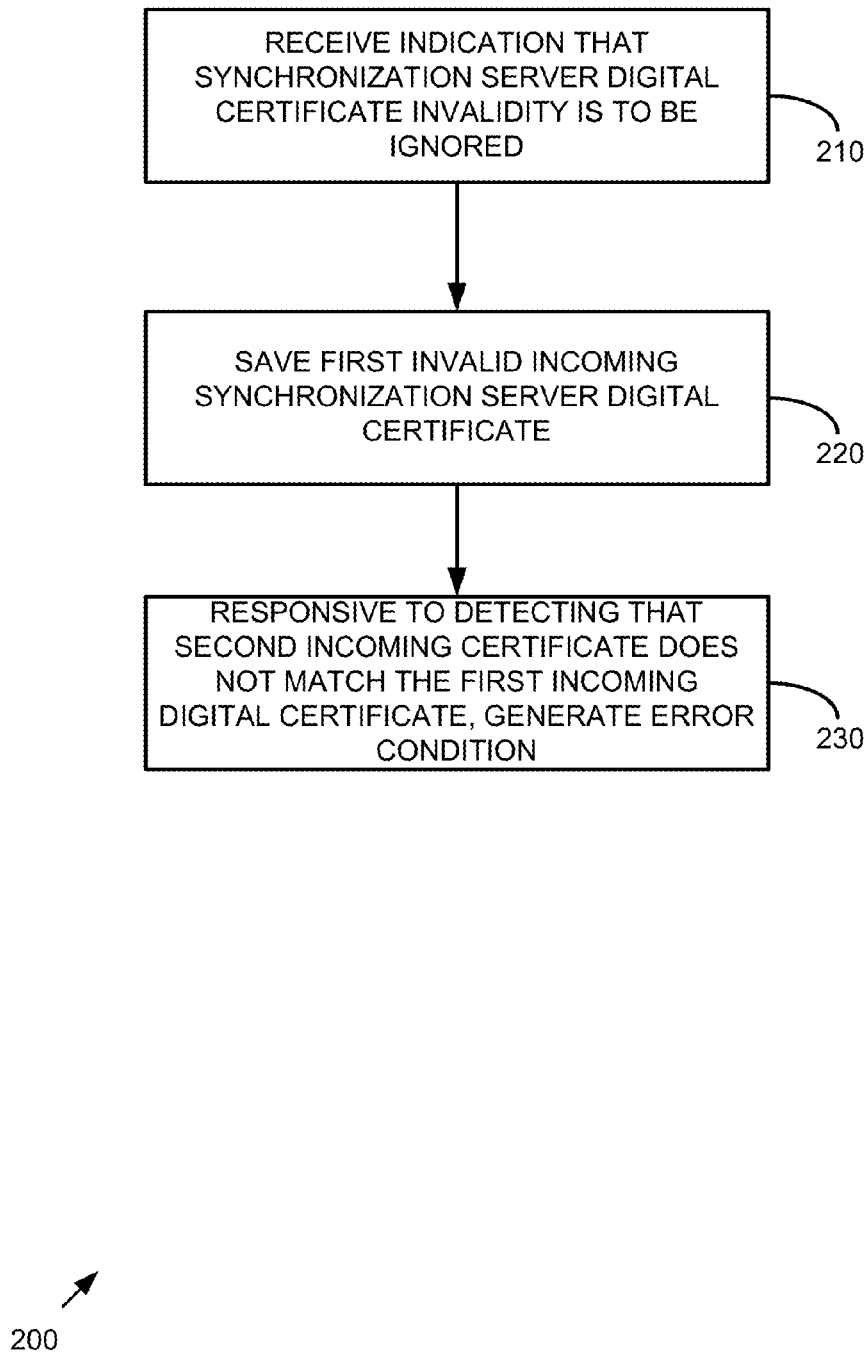
FIG. 2 is a flowchart of an exemplary method of invalid digital certificate processing.

FIG. 2 is a flowchart of an exemplary method 200 of invalid digital certificate processing and can be implemented, for example, in the system shown in FIG. 1.

At 210, an indication that synchronization server digital certificate invalidity is to be ignored is received. As described herein, such an indication can be activation of a user interface element indicated as activatable to ignore invalidity (e.g., presented as part of a user interface).

At 220, an invalid incoming synchronization server digital certificate is saved (e.g., via a persisted invalid synchronization server digital certificate identifier). As described herein, the invalid certificate can be associated with the name of the server that provided it. In this way, a trust relationship with the server is established even though the digital certificate is invalid. In practice, such a digital certificate can be received (e.g., from the server) during synchronization setup or initial sync over a trusted network as described herein. Another way the digital certificate can be received is through a different channel (e.g., via a printed or electronic document having the certificate). For example, a server administrator can provide the digital certificate to a user for use during synchronization account setup or initial sync.

An administrator can provide the digital certificate of a certificate authority (e.g., a root certificate) that issued a server certificate. After the root certificate is installed, any certificate issued by the corresponding authority becomes trusted.

As described herein, the digital certificate can be saved via a digital certificate identifier (e.g., a persisted invalid synchronization server digital certificate identifier).

At 230, responsive to detecting that a second incoming certificate (e.g., received during subsequent synchronization server communication) does not match the persisted invalid synchronization server digital certificate identifier, an error condition is generated. Such detecting can be achieved by detecting that a persisted invalid synchronization server digital certificate identifier indicates that the second incoming certificate does not match the first incoming certificate. For example, an identifier of the second incoming certificate (e.g., generated as described herein) can be compared with the persisted certificate identifier.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4

Exemplary Synchronization Server

In any of the examples herein, a synchronization server can be a server that provides synchronization functionality to synchronization clients. Synchronization functionality can include synchronizing (e.g., sending and receiving) emails, contacts, calendar information (e.g., appointments, holidays, and the like), tasks, and combinations thereof. For example, a personal information manager can provide access to emails, contacts, calendar information, tasks, and the like as user information by implementing or using a synchronization client in communication with (e.g., to send and receive information from) a synchronization server.

When a synchronization client contacts a synchronization server to send or receive data, the process is sometimes called a "sync." In practice, a client periodically syncs with the server to receive information. When sending information, the client can perform the sync immediately (e.g., and also receive any information pending at the server). The user can set up one or more synchronization accounts (e.g., via username, email address, or the like) on a device with specified synchronization servers.

Example 5

Exemplary Synchronization Server Digital Certificates

In any of the examples herein, a synchronization server digital certificate can be used to establish the identity of a synchronization server. In practice, a digital certificate can contain a server identity (e.g., server name, network address, or the like), an expiration date, an issuer, and the like. A digital signature can be used to bind a public key (e.g., contained in the certificate) with the identity information according to a public key infrastructure convention. The issuer can be a certificate authority that serves as a trusted entity that issues the digital certificate.

If the synchronization server digital certificate is found to be valid, it can be assumed with reasonable certainty that the public key does in fact belong to the server, and a secure communication session can be arranged (e.g., via the public key). Validity typically is determined with reference to a well-known certificate authority (e.g., only certain certificate authorities are trusted and accepted).

In synchronization communications, after the digital certificate is provided, a secure communication session can be used to encrypt user credentials, user content (e.g., emails, contacts, calendar information, tasks, or the like), and the like.

Example 6

Exemplary Invalid Synchronization Server Digital Certificates

Digital Certificates can be invalid for any of a variety of reasons. Such reasons include that the server identity does not match with the server to which communication was initiated (e.g., after requesting a certificate from entity X, a certificate for entity Y was received). Such a mismatch can be determined by comparing the name in the certificate with the server name being contacted.

Another reason is that the certificate is expired. Such invalidity can be determined by comparing the current date with the expiration date of the certificate.

Another reason is that the certificate authority is not on a list of trusted certificate authorities. Such invalidity can be determined by comparing the certificate authority of the certificate with a list of trusted authorities. Such a list is typically stored on or retrieved to the client computing device.

Another reason is that the certificate authority's public key indicates that the digital signature on the certificate is not correct. Such invalidity can be determined by obtaining the certificate authority's public key (e.g., stored in the device or acquired via a network) and applying public key cryptography techniques to check the digital signature.

Other reasons are possible and can be supported by the technologies herein.

Example 7

Exemplary Error Condition

In any of the examples herein, an error condition can be generated when it is found that a subsequent incoming synchronization server digital certificate does not match a synchronization server digital certificate that was persisted.

Such an error condition can result in a variety of actions. For example, responsive to the error condition, an error message can be shown, a dialog box with a warning can be displayed, communication with the computer providing the incoming synchronization server digital certificate can be inhibited, the synchronization account can be blocked, syncing for the affected account can be inhibited (e.g., fail), a warning indicating that syncing failed can be presented, or the like. Combinations of two or more of the foregoing are also supported.

In the case of not allowing the user to continue communicating with the computer presenting the non-matching certificate, the error is sometimes called "noncontinuable" because the user can be prohibited from (e.g., is not given the option of) allowing the device to continue communicating with the computer (e.g., until the certificate condition is remedied).

If a matching digital certificate is provided in subsequent communications, processing can resume normally.

For advanced users, additional information about the error condition and an option to override the error can be provided.

Example 8

Exemplary Digital Certificate Identifiers

In any of the examples herein, a digital certificate identifier can be used to identify an underlying digital certificate. For example, although the certificate itself can be used to identify the certificate, a portion of the certificate, a cryptographic hash of the certificate or a portion thereof, a digital digest of the certificate or a portion thereof, a thumbprint of the certificate or a portion thereof, or the like can be used as a digital certificate identifier.

When saving a digital certificate, an identifier of the digital certificate can be persisted so that the identifier can be subsequently used to determine whether a subsequent digital certificate matches the initial digital certificate (e.g., by generating an identifier for the subsequent digital certificate and comparing identifiers).

Example 9

Exemplary Matching Certificates

In any of the examples herein, determining whether an incoming digital certificate and a persisted digital certificate match can be accomplished by comparing whether the contents of the two digital certificates are identical.

Rather than directly comparing the two certificates (e.g., to see if they have identical fields), identifiers of the certificates (e.g., generated by the same techniques) can be compared. For example, a cryptographic hash of the incoming digital certificate can be computed and compared with the persisted cryptographic hash of the initial invalid certificate (e.g., the initial invalid certificate itself need not be stored). Identity can thus be assured if the hashes match because it is virtually impossible to have two different certificates with the same cryptographic hash (e.g., SHA-1, or the like). Any number of other matching and saving techniques can be applied to determine whether the two certificates match.

Example 10

Exemplary Indication that Invalidity is to be Ignored

In any of the examples herein, an indication that synchronization server digital certificate invalidity is to be ignored can comprise receiving an activation of an activatable user element. Such a user interface element can be presented as part of a user interface and be done responsive to detecting that an incoming certificate is invalid.

Such a user interface can be labeled to indicate that activating the element will result in ignoring certificate invalidity.

For example, a dialog box stating that the certificate has been detected as invalid and giving the option to ignore invalidity can be presented. Alternately, a checkbox can be checked to indicate that invalidity is to be ignored. If desired, details of the certificate can be displayed for consideration by a user to verify validity or invalidity by inspection.

Responsive to detecting that invalidity is to be ignored, the techniques described herein for detecting whether subsequent certificates match can be implemented (e.g., including saving the current incoming certificate as a persisted invalid certificate).

Example 11

Exemplary Exception List

In any of the examples herein, a server exception list can be stored. An exception list can indicate well-known synchronization servers (e.g., hotmail.com, gmail.com, yahoo.com, and the like). For servers appearing on the exception list of well-known synchronization servers, ignoring digital certificate invalidity can be disallowed. Because a device can support multiple synchronization accounts, it is possible that a server for one account is on the list while a server for another is not.

Example 12

Exemplary Phases of Invalid Digital Certificate Processing

Figure 3:
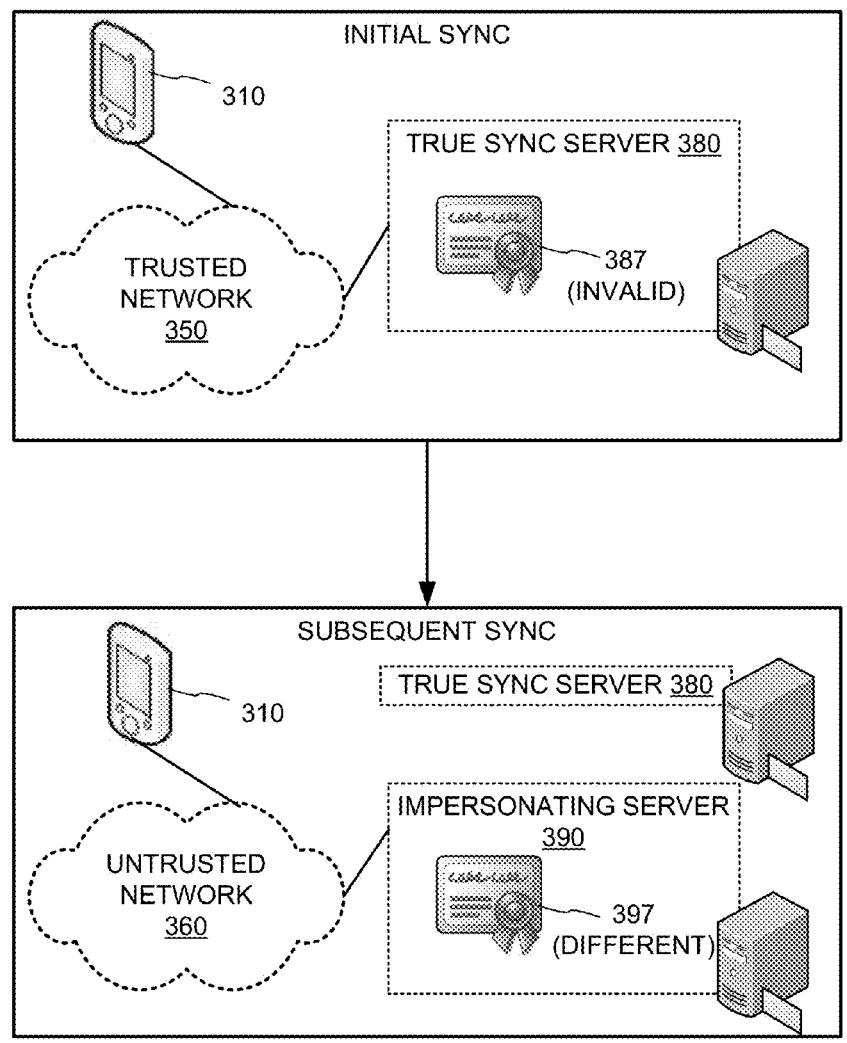
FIG. 3 is a block diagram showing phases of invalid digital certificate processing.

FIG. 3 is a block diagram showing phases of an invalid digital certificate processing scenario 300. To send or receive user information, an information synchronization ("sync") can be performed. In the example, during an initial sync phase on the device 310, the device 310 accesses a synchronization server 380 (e.g., the actual synchronization server that is intended to be contacted) that provides an invalid certificate 387 over a network 350. In practice, the network 350 is typically a trusted network, such as a work or home network. As described herein, a user can be given an opportunity to indicate that the invalidity of the certificate can be ignored. An initial sync can be done during or after set up of a synchronization account. Alternatively, the described digital certificate processing can be performed as part of the synchronization setup process.

During a subsequent sync phase, during syncing on the device 310, the device 310 attempts to access the synchronization server 380, but actually is connected to an impersonating server 390, that provides a different certificate 397 (e.g., one that is not identical to the invalid certificate 387). In practice, the network 360 is typically an untrusted network, such as a public network (e.g., at an Internet café, coffee shop, or the like). As described herein, even if the user has indicated that invalidity of the certificate 387 can be ignored, a comparison of certificates 387, 397 can determine that the device 310 is connecting to a different server, which can indicate that the server 390 is impersonating the true synchronization server 380. So, rather than giving the user another opportunity to ignore the invalidity of the certificate 397 (e.g., if it happens to be invalid) or communicating normally with the server 390, an error condition can be generated as described herein.

Example 13

Exemplary Method of Invalid Digital Certificate Processing in Phases

Figure 4:
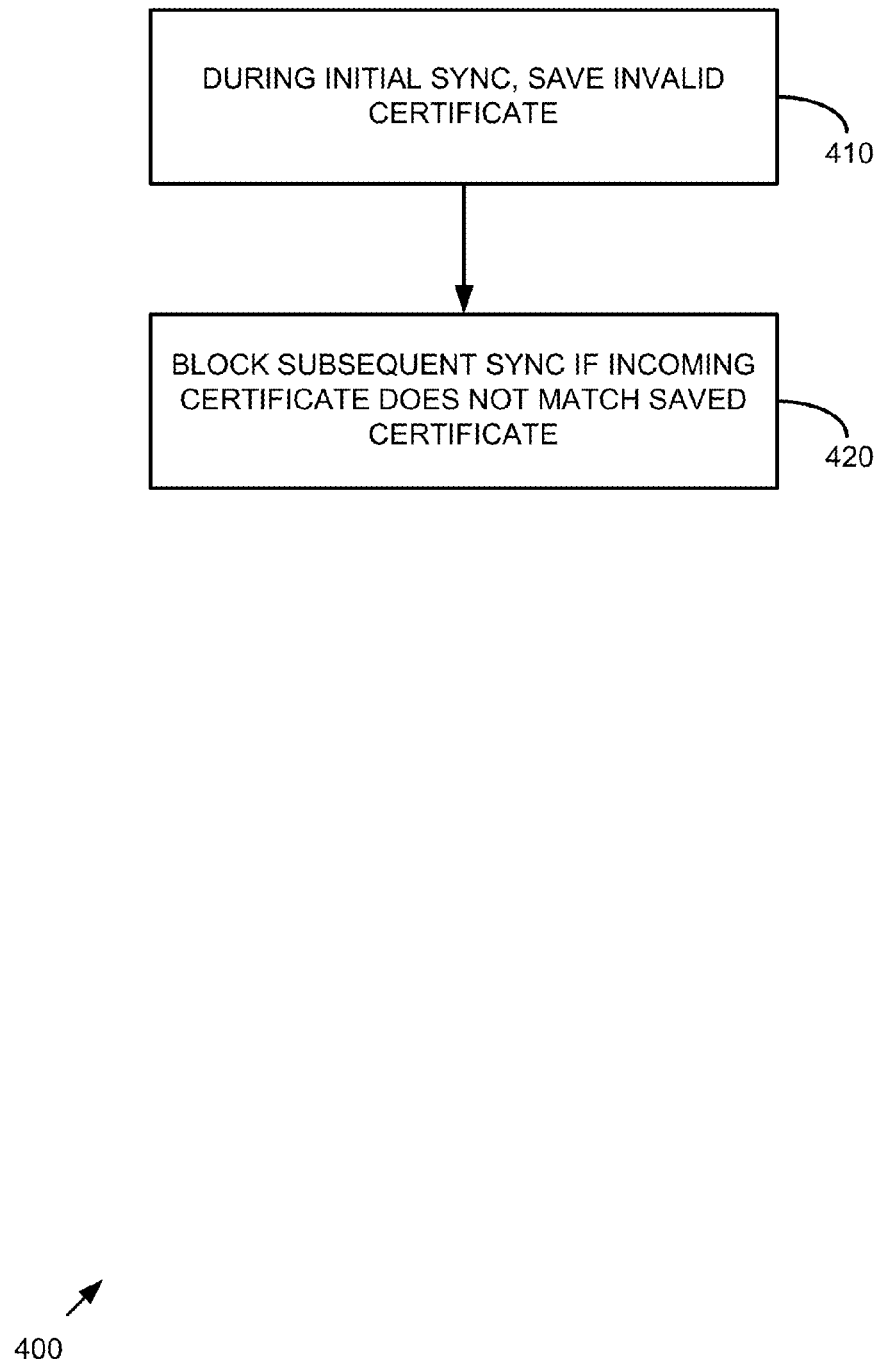
FIG. 4 is a flowchart of an exemplary method of invalid digital certificate processing in phases.

FIG. 4 is a flowchart of an exemplary method 400 of invalid digital certificate processing and can be implemented, for example, in the systems shown in FIGS. 1 and 3. The features used in a phased approach can be implemented in any of the other examples herein.

At 410, during initial sync on a device, an invalid certificate is saved. As described herein, saving can be accomplished by persisting a certificate identifier for the certificate.

At 420, a subsequent sync operation is blocked responsive to detecting that an incoming digital certificate does not match the saved (e.g., persisted) certificate.

Example 14

Exemplary Invalid Digital Certificate Processing During Initial Sync Phase

Figure 5:
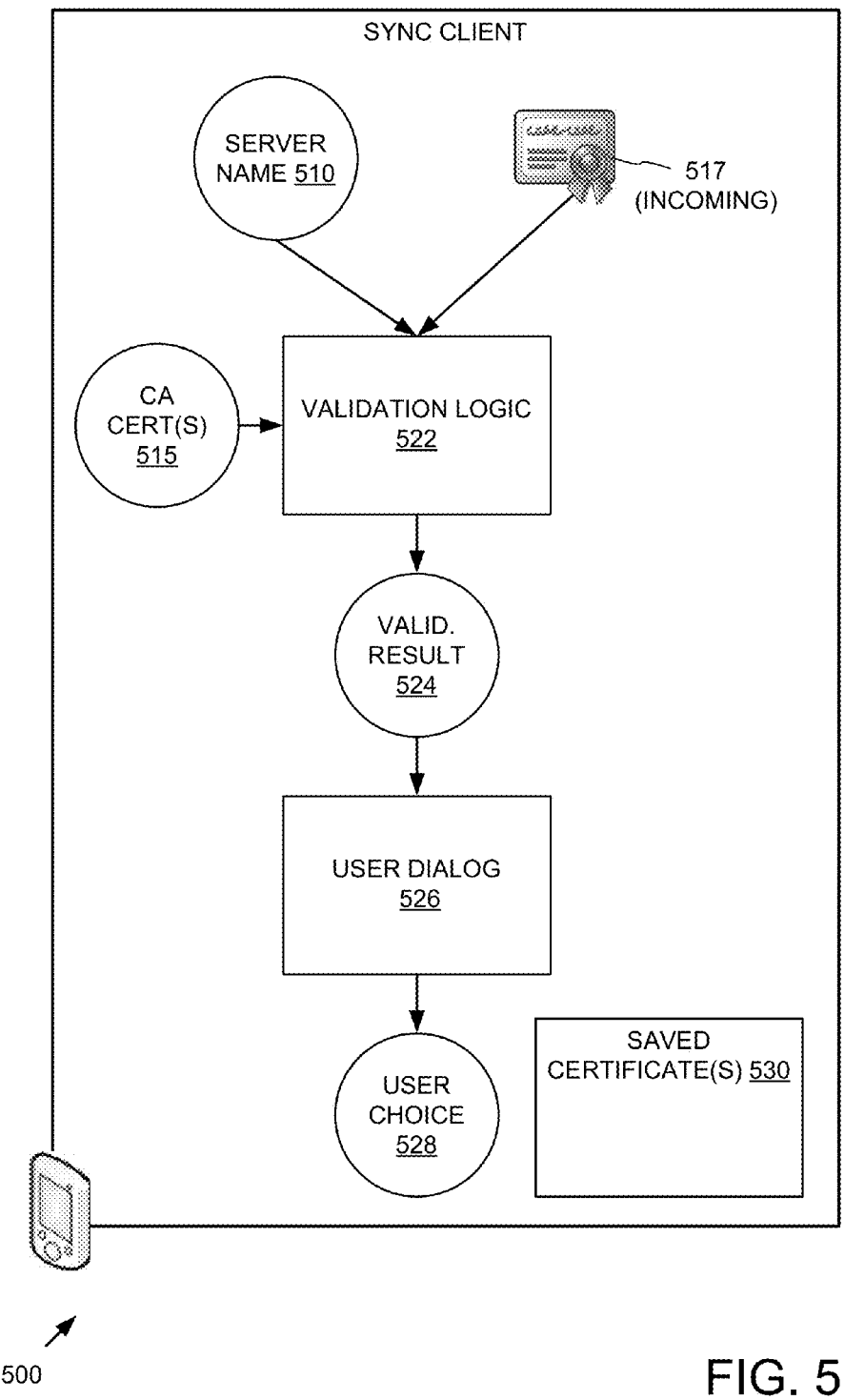
FIG. 5 is a block diagram of an exemplary system implementing invalid digital certificate processing during an initial sync.

FIG. 5 is a block diagram of an exemplary system 500 implementing invalid digital certificate processing during an initial sync (e.g., for a synchronization client). In any of the examples herein, processing described as taking place during an initial sync can take place instead during synchronization account setup. In the example, during the normal course of synchronization account setup, a server name 510 is received (e.g., as specified by a user). The server name 510 can be used to acquire an incoming digital certificate 517 (e.g., provided by the synchronization server having the server name 510).

Validation logic 522 can check the digital certificate 517 to determine whether it is valid as described herein. Validation logic 522 can also take into account known certificate authority certificates 515 (e.g., to validate that the certificate authority that has signed the certificate is known). A validation result 524 can be generated. For purposes of the example, the validation result 524 indicates that the incoming digital certificate 517 is invalid. As a result, the validation logic 522 (e.g., part of a security checker) is configured to present a user dialog with a user interface element activatable to indicate that invalidity is to be ignored. A storage 528 for the user's choice (e.g., to ignore invalidity) can maintain an indication that invalidity is to be ignored. The incoming certificate 517 can be saved in the digital certificate storage 530 (e.g., as a certificate identifier).

Example 15

Figure 6:
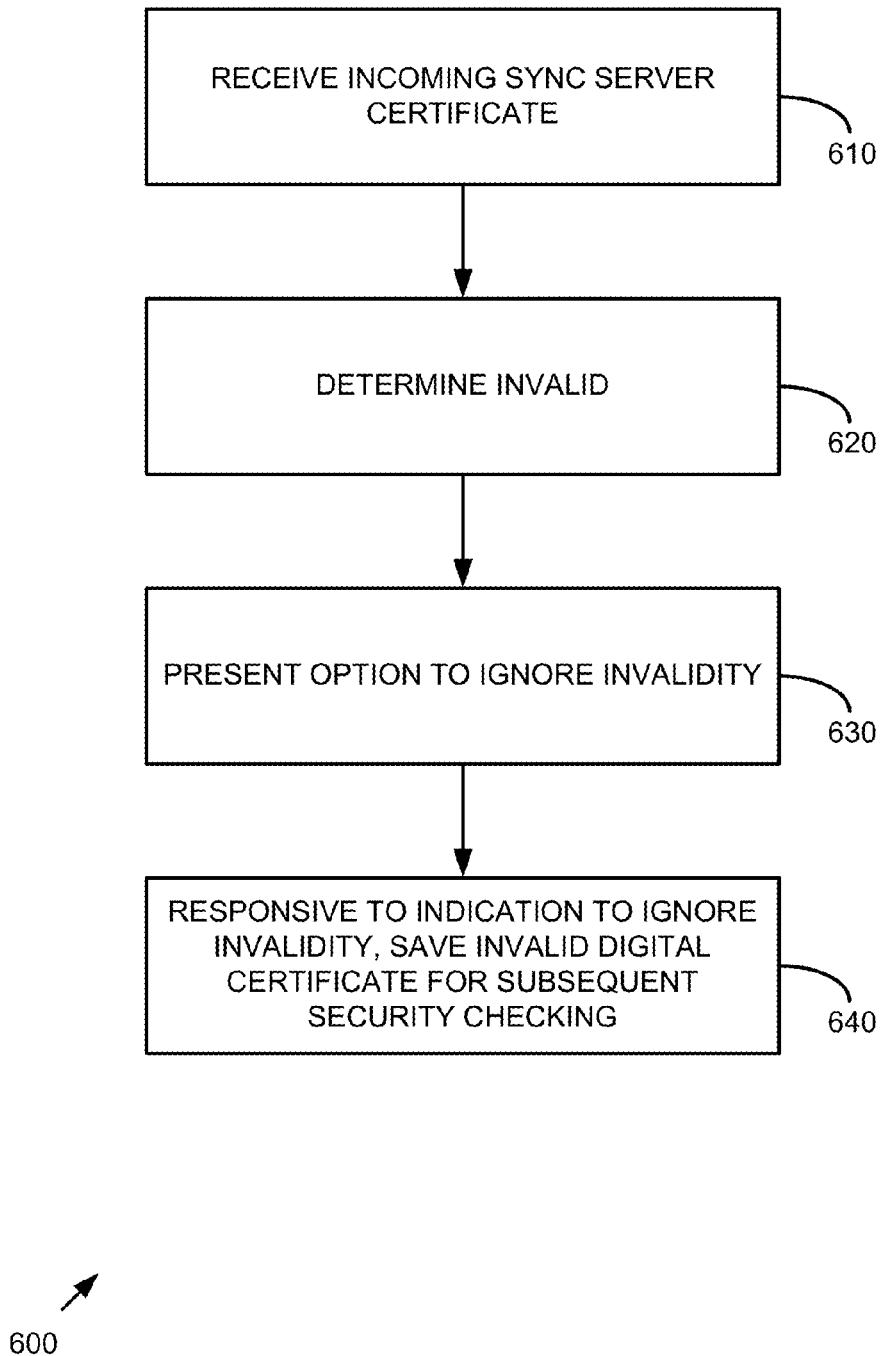
FIG. 6 is a flowchart of an exemplary method implementing invalid digital certificate processing during an initial sync.

Exemplary Method of Invalid Digital Certificate Processing During Initial Sync FIG. 6 is a flowchart of an exemplary method 600 implementing invalid digital certificate processing during an initial sync.

At 610, during an initial sync, a (first) incoming synchronization server digital certificate is received.

At 620, it is determined that the incoming synchronization server certificate is invalid.

At 630, responsive to determining that the (first) incoming synchronization server digital certificate is invalid, an option is presented to ignore invalidity of the synchronization server digital certificate.

At 640, responsive to an indication to ignore invalidity, the invalid digital certificate is saved (e.g., during setup for the synchronization account) for subsequent security checking as described herein.

Example 16

Exemplary System with Subsequent Syncing Phase

Figure 7:
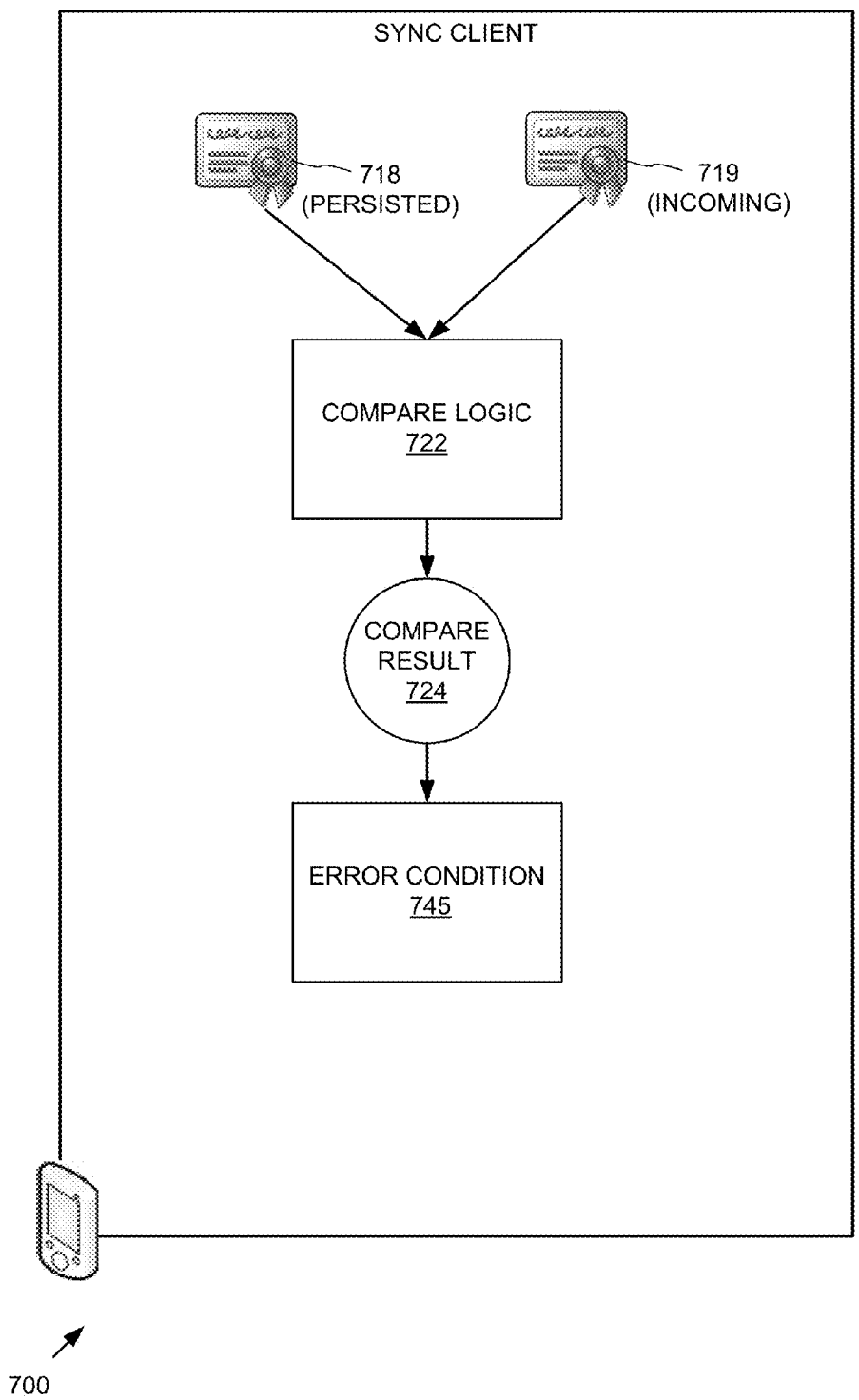
FIG. 7 is a block diagram of an exemplary system implementing invalid digital certificate processing during subsequent syncing.

FIG. 7 is a block diagram of an exemplary system 700 implementing invalid digital certificate processing during subsequent syncing (e.g., for a synchronization client, after the initial sync). In implementations where a digital certificate is saved during synchronization setup, the described techniques can be applied to syncing after setup.

In the example, compare logic 722 (e.g., part of a security checker) accepts a persisted digital certificate identifier 718 and a subsequent incoming digital certificate 719, compares the two (e.g., by generating a certificate identifier for the subsequent incoming digital certificate), and provides the compare result 724. A same server name can be associated with both of the certificates.

If the compare result 724 indicates that the certificate identifier 718 and the certificate 719 do not match, an error condition 745 is generated.

Example 17

Exemplary Method with Subsequent Syncing Phase

Figure 8:
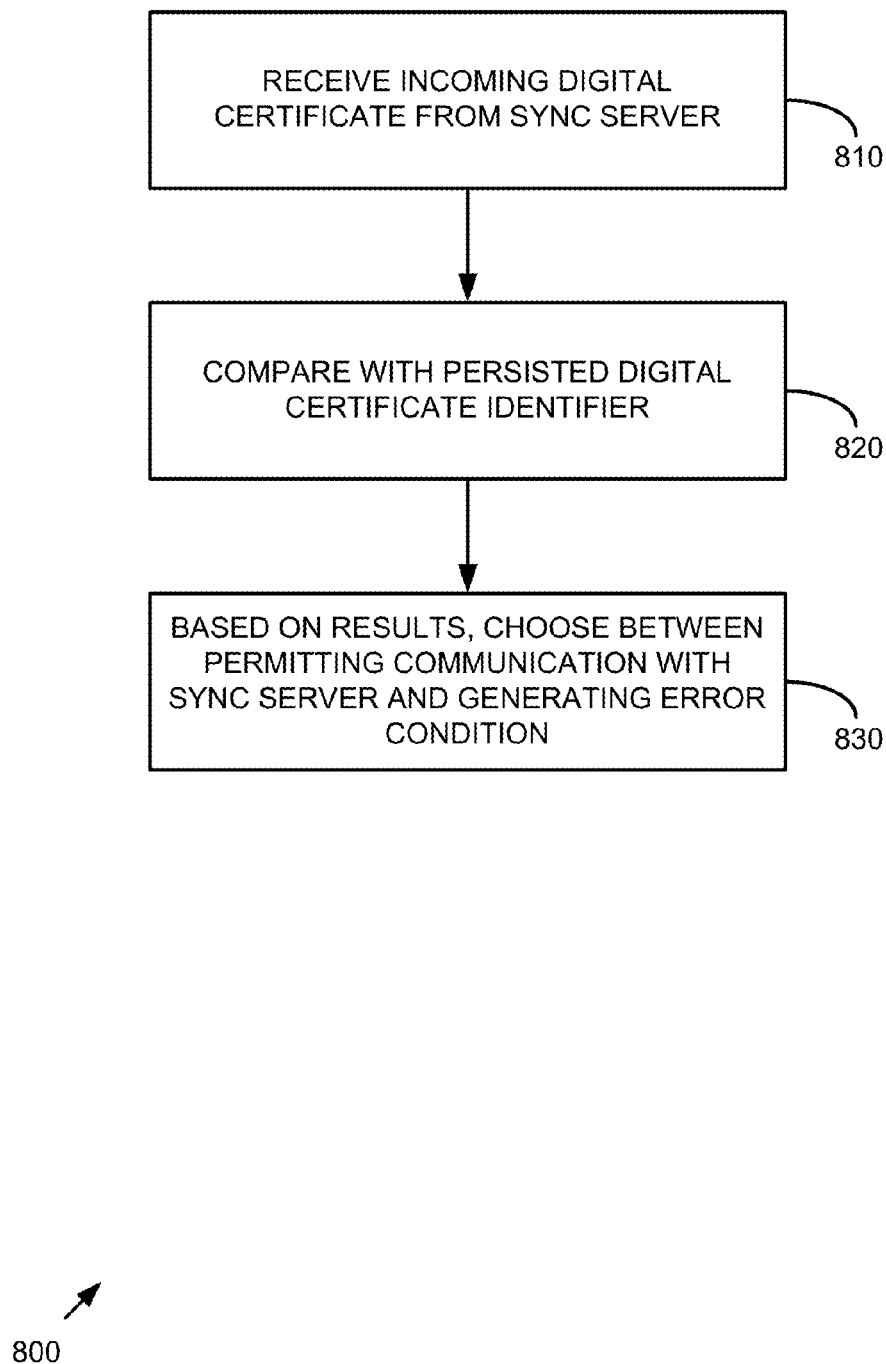
FIG. 8 is a flowchart of an exemplary method implementing invalid digital certificate processing during subsequent syncing.

FIG. 8 is a flowchart of an exemplary method 800 implementing invalid digital certificate processing during subsequent syncing performed subsequent to the initial syncing described herein.

At 810, a (second) incoming digital certificate is received from a synchronization server (e.g., as part of the sync process).

At 820, the (second) incoming digital certificate is compared with a persisted digital certificate identifier (e.g., associated with a name of the server).

At 830, based on the results, the method chooses between permitting communication with the synchronization server (e.g., if the certificates match) and generating an error condition (e.g., if the certificates do not match). Such choosing can also take into account whether invalidity was indicated as to be ignored (e.g., if invalidity was not indicated to be ignored, then the invalidity can be checked, and an invalid certificate can result in an error condition or warning).

Example 18

Exemplary User Interface

In any of the examples herein, a user interface can be presented responsive to encountering an error condition. The user interface can present an error message indicating that an error has occurred. Further details of the error may or may not be desirable depending on circumstances. For example, the synchronization server name can be displayed so the user can determine which synchronization account is involved.

Figure 9:
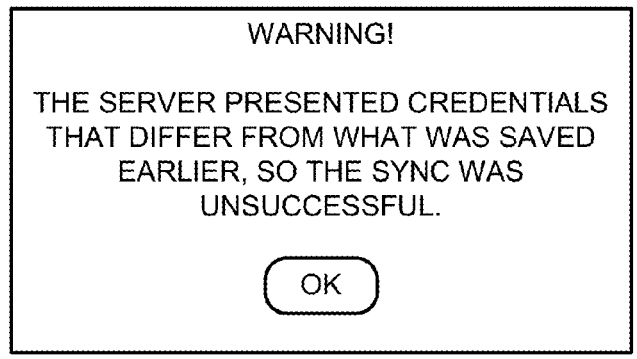
FIG. 9 is a screen shot of an exemplary user interface for invalid digital certificate processing.

FIG. 9 is a screen shot of an exemplary user interface 900 for invalid digital certificate processing. In the example, the user interface 900 is presented as a dialog box that informs the user that a synchronization server presented credentials that differ from the credentials that were earlier presented. Accordingly, syncing is inhibited (e.g., is unsuccessful, fails, etc.).

A later attempt to sync may acquire a digital certificate that matches the persisted one, so syncing may resume if such is the case.

Example 19

Exemplary Detailed Method

Figure 10:
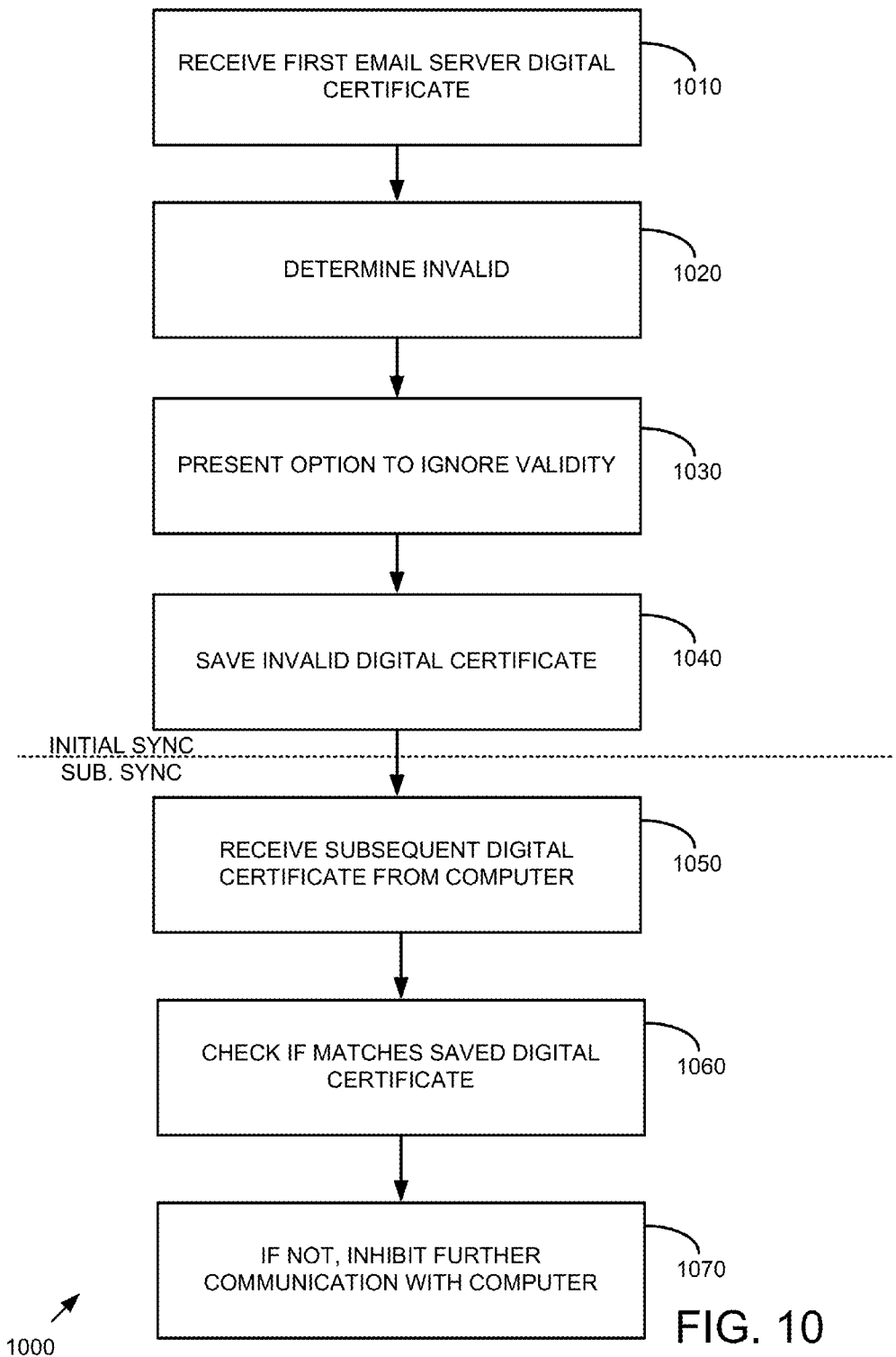
FIG. 10 is a flowchart of an exemplary method implementing the technologies described herein.

FIG. 10 is a flowchart of an exemplary method 1000 implementing the technologies described herein to establish identity of a synchronization server. In the example, an email server is involved, but the technologies can be equally applied to servers providing other or additional synchronization functionality. Any of the features herein can be incorporated into any of the examples described herein.

At 1010, a first email server digital certificate indicating an email server identity is received as described herein (e.g., during initial sync of an email account with the email server).

At 1020, it is determined that the first digital certificate is invalid. If instead, the digital certificate is determined to be valid, syncing can proceed without any issues.

At 1030, responsive to determining that the first digital certificate is invalid, an option to ignore invalidity of the first digital certificate is presented.

At 1040, responsive to selection of the option to ignore invalidity of the first digital certificate, the invalid first digital certificate is saved, and the method shown in the sync phase is performed. Syncing of the email account is permitted.

If instead, the user indicates that invalidity is not to be ignored, communication with the server will fail due to the certificate error. Syncing will not function until the server presents a valid certificate (or invalidity is ignored as described herein).

At 1050, during subsequent communications with a computer (e.g., which may not be the same as the email server), a subsequent digital certificate is received from the computer. If the server certificate was valid during the account set up, the server certificate needs to remain valid for subsequent syncs. If the server certificate was invalid during the set up and the option to continue (e.g., ignore invalidity) was chosen, any change in the server certificate during subsequent syncs triggers an error condition.

At 1060, it is checked whether the subsequent digital certificate matches the saved invalid first digital certificate. As described herein, certificate identifiers can be used to compare certificates.

At 1070, responsive to determining that the subsequent digital certificate does not match the saved invalid first digital security certificate, further communication with the computer is inhibited (e.g., the sync fails). An error condition can be generated as described herein.

Example 20

Plural Servers Per Synchronization Account

In any of the examples, a synchronization account may involve more than one server (e.g., one for sending and one for receiving email). The techniques described herein can be applied to both servers (e.g., a separate persisted digital certificate can be stored for the respective servers). In such a case, there can be more than one saved digital certificate (e.g., one for an outgoing server and one for an incoming server) per synchronization account.

There can be cases where a client device has received information from an incoming server but has yet to send any information to the outgoing server. Separate validity checks as described herein can be done for the servers when first attempting to establish a secure communication channel with the server needed for the appropriate part of the synchronization process.

Example 21

Exemplary Advantages

In any of the examples herein, synchronization security can continue to be provided even though a certificate is found to be invalid. Because a digital certificate can be invalid for non-malicious reasons, such technologies can be useful for improving software security. For example, a small business or hobbyist may wish to have an email server with a digital certificate to take advantage of secure email communications but may wish to forgo the cost and effort of obtaining a digital certificate issued by a well-known trusted certificate authority (e.g., VersiSign or the like). In such a case, a computing device may find the certificate to be invalid. However, taking advantage of the technologies described herein, some assurance of server identity can be provided.

In the ordinary course of interacting with a server, a user may become accustomed to seeing errors and therefore may continue to instruct the computing device to ignore such errors. However, if a digital certificate does not match the one saved earlier for the same server, it is typically an indication that the server's identity is in question. The device can thus block communications, avoiding a bad decision (e.g., ignoring validity yet again) by the user.

By detecting that server identity is in question (e.g., an incoming certificate does not match a persisted one for the same server), a variety of attacks can be avoided. One such attack is called a man-in-the-middle attack because the attacker is interposed between the user and the synchronization server. The attack can intercept user credentials (e.g., username and password), which can then be used in further attacks. Such an attack may go undetected for some time.

As described herein, if it is detected that the interposed computer impersonating the original synchronization server presents a digital certificate that does not match a persisted certificate saved in the system, further communication with the computer can be inhibited, preventing sending the user credentials to the impersonating computer.

Although alternatives can also be used, presenting a simple user interface for ignoring invalidity upon detection of the invalidity can save the user from having to navigate to a more complex interface mechanism (e.g., to add the certificate to a list of accepted certificates).

Example 22

Exemplary Computing Systems

Figure 11:
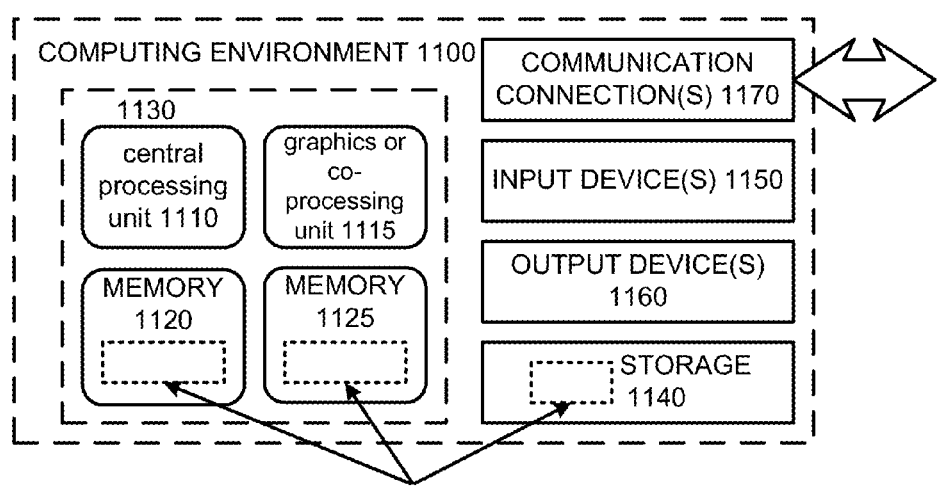
FIG. 11 is a diagram of an exemplary computing system in which some described embodiments can be implemented.

FIG. 11 illustrates a generalized example of a suitable computing system 1100 in which several of the described innovations may be implemented. The computing system 1100 is not intended to suggest any limitation as to scope of use or functionality, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system 1100, computer-readable media include memory 1120, 1125, storage 1140, and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 23

Exemplary Mobile Device

Figure 12:
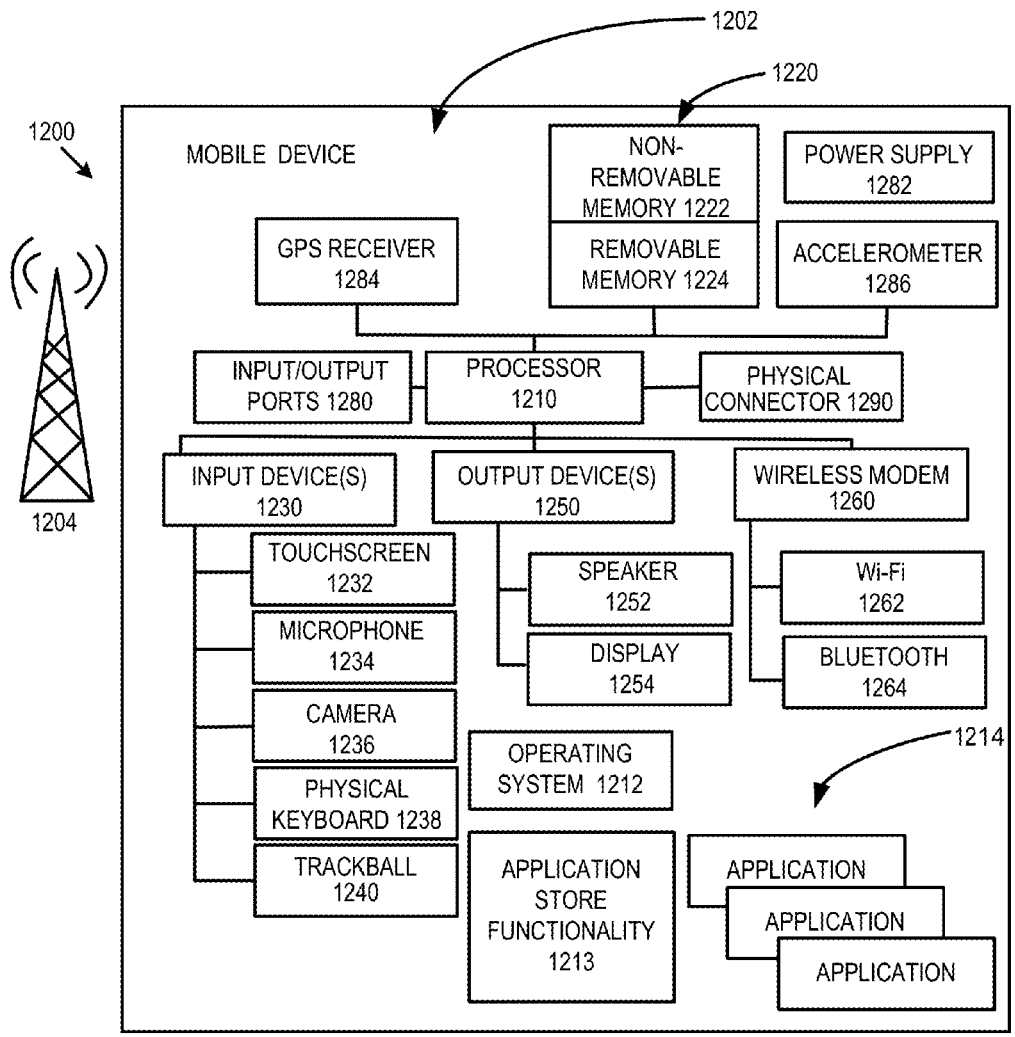
FIG. 12 is an exemplary mobile device that can be used for invalid digital certificate processing.
Figure 13:
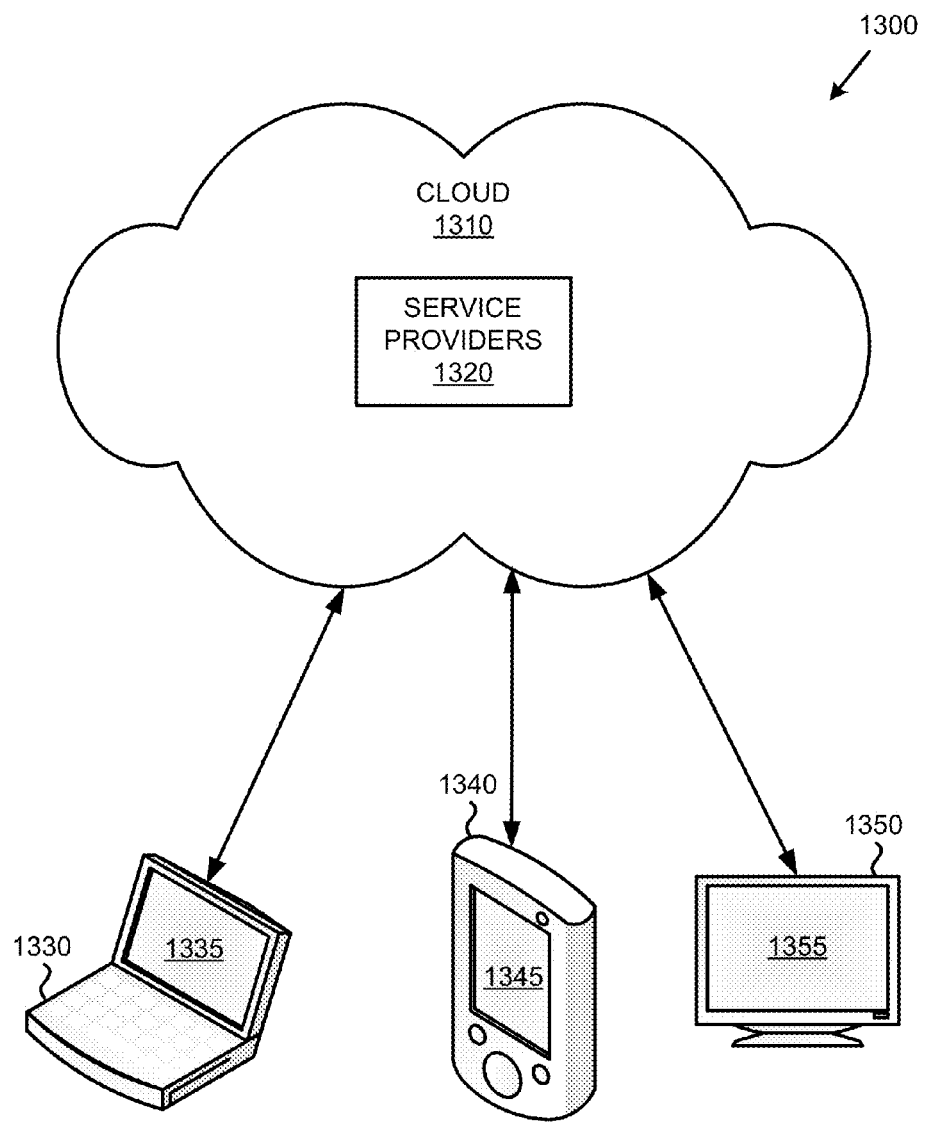
FIG. 13 is an exemplary cloud-support environment that can be used in conjunction with the technologies described herein.

FIG. 12 is a system diagram depicting an exemplary mobile device 1200 including a variety of optional hardware and software components, shown generally at 1202. Any components 1202 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1204, such as a cellular, satellite, or other network.

The illustrated mobile device 1200 can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components 1202 and support for one or more application programs 1214. The application programs 1214 can include common mobile computing applications (e.g., email applications, calendars, contact managers, web browsers, messaging applications), or any other computing application. Functionality 1213 for accessing an application store can also be used for acquiring and updating applications 1214.

The illustrated mobile device 1200 can include memory 1220. Memory 1220 can include non-removable memory 1222 and/or removable memory 1224. The non-removable memory 1222 can include RAM, ROM, flash memory, a hard disk, or other well-known memory storage technologies. The removable memory 1224 can include flash memory or a Subscriber Identity Module (SIM) card, which is well known in GSM communication systems, or other well-known memory storage technologies, such as "smart cards." The memory 1220 can be used for storing data and/or code for running the operating system 1212 and the applications 1214. Example data can include web pages, text, images, sound files, video data, or other data sets to be sent to and/or received from one or more network servers or other devices via one or more wired or wireless networks. The memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1200 can support one or more input devices 1230, such as a touch screen 1232, microphone 1234, camera 1236, physical keyboard 1238 and/or trackball 1240 and one or more output devices 1250, such as a speaker 1252 and a display 1254. Other possible output devices (not shown) can include piezoelectric or other haptic output devices. Some devices can serve more than one input/output function. For example, touchscreen 1232 and display 1254 can be combined in a single input/output device.

A wireless modem 1260 can be coupled to an antenna (not shown) and can support two-way communications between the processor 1210 and external devices, as is well understood in the art. The modem 1260 is shown generically and can include a cellular modem for communicating with the mobile communication network 1204 and/or other radio-based modems (e.g., Bluetooth or Wi-Fi). The wireless modem 1260 is typically configured for communication with one or more cellular networks, such as a GSM network for data and voice communications within a single cellular network, between cellular networks, or between the mobile device and a public switched telephone network (PSTN).

The mobile device 1200 can further include at least one input/output port 1280, a power supply 1282, a satellite navigation system receiver 1284, such as a Global Positioning System (GPS) receiver, an accelerometer 1286, and/or a physical connector 1290, which can be a USB port, IEEE 1394 (FireWire) port, and/or RS-232 port. The illustrated components 1202 are not required or all-inclusive, as any components can deleted and other components can be added.

Example 24

Exemplary Cloud-Supported Environment

In example environment 1300, the cloud 1310 provides services for connected devices 1330, 1340, 1350 with a variety of screen capabilities. Connected device 1330 represents a device with a computer screen 1335 (e.g., a mid-size screen). For example, connected device 1330 could be a personal computer such as desktop computer, laptop, notebook, netbook, or the like. Connected device 1340 represents a device with a mobile device screen 1345 (e.g., a small size screen). For example, connected device 1340 could be a mobile phone, smart phone, personal digital assistant, tablet computer, and the like. Connected device 1350 represents a device with a large screen 1355. For example, connected device 1350 could be a television screen (e.g., a smart television) or another device connected to a television (e.g., a set-top box or gaming console) or the like. One or more of the connected devices 1330, 1340, 1350 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1300. For example, the cloud 1310 can provide services for one or more computers (e.g., server computers) without displays.

Services can be provided by the cloud 1310 through service providers 1320, or through other providers of online services (not depicted). For example, cloud services can be customized to the screen size, display capability, and/or touch screen capability of a particular connected device (e.g., connected devices 1330, 1340, 1350).

In example environment 1300, the cloud 1310 provides the technologies and solutions described herein to the various connected devices 1330, 1340, 1350 using, at least in part, the service providers 1320. For example, the service providers 1320 can provide a centralized solution for various cloud-based services. The service providers 1320 can manage service subscriptions for users and/or devices (e.g., for the connected devices 1330, 1340, 1350 and/or their respective users).

Example 25

Exemplary Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Non-Transitory Computer-Readable Media

Any of the computer-readable media herein can be non-transitory (e.g., memory, magnetic storage, optical storage, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:
1. A method comprising:
performing by at least one computing device:
during communications with a true synchronization server, receiving an invalid first incoming synchronization server digital certificate;
receiving an indication that synchronization server digital certificate invalidity is to be ignored;
saving the invalid first incoming synchronization server digital certificate via a persisted invalid synchronization server digital certificate identifier; and during a subsequent attempt to access the true synchronization server, communicating with an impersonating synchronization server impersonating the true synchronization server, and receiving a second incoming synchronization server digital certificate from the impersonating synchronization server; and responsive to detecting that the persisted invalid synchronization server digital certificate identifier indicates that the second incoming synchronization server digital certificate of the impersonating synchronization server does not match the invalid first incoming synchronization server digital certificate of the true synchronization server, generating an error condition.

2. The method of claim 1 further comprising:
responsive to the error condition, inhibiting further synchronization communications with the impersonating synchronization server.

3. The method of claim 1 further comprising:
presenting a user interface comprising a user interface element indicated as activatable to ignore invalidity;
wherein the indication that synchronization digital certificate invalidity is to be ignored comprises receiving activation of the user interface element.

4. The method of claim 3 wherein:
the presenting is performed responsive to detecting that the invalid first incoming synchronization server digital certificate is invalid.

5. The method of claim 1 wherein:
generating the error condition comprises displaying a warning.

6. The method of claim 5 wherein:
the warning indicates that syncing failed.

7. The method of claim 1 further comprising:
responsive to the error condition, inhibiting syncing.

8. The method of claim 1 further comprising:
during setup or initial sync of a synchronization account, receiving the first incoming synchronization server digital certificate;
determining that the first incoming synchronization server digital certificate is invalid; and
responsive to determining that the first incoming synchronization server digital certificate is invalid, presenting an option to ignore synchronization server digital certificate invalidity.

9. The method of claim 1 wherein:
the saving is performed during initial sync or setup for an email account; and
the second incoming synchronization server digital certificate is obtained during subsequent syncing for the email account.

10. The method of claim 1 further comprising:
disallowing ignoring digital certificate invalidity for synchronization servers appearing on a list of well-known synchronization servers.

11. One or more computer-readable storage devices comprising computer-executable instructions causing a computing device to perform a method comprising:
during communications with a true synchronization server, receiving an invalid first incoming synchronization server digital certificate;
receiving an indication that synchronization server digital certificate invalidity is to be ignored;
saving the invalid first incoming synchronization server digital certificate via a persisted invalid synchronization server digital certificate identifier; and
during a subsequent attempt to access the true synchronization server, communicating with an impersonating synchronization server impersonating the true synchronization server, and receiving a second incoming synchronization server digital certificate from the impersonating synchronization server; and responsive to detecting that the persisted invalid synchronization server digital certificate identifier indicates that the second incoming synchronization server digital certificate of the impersonating synchronization server does not match the invalid first incoming synchronization server digital certificate of the true synchronization server, generating an error condition.

12. A system comprising:
one or more processors;
memory;
saved digital certificate storage configured to persist a first persisted invalid server digital certificate identifier for an invalid first incoming server digital certificate received during communications with a first server; and
a security checker configured to receive a subsequent incoming server digital certificate during attempted subsequent communications with the first server and indicated as from the first server but actually from an impersonating server impersonating the first server, and further configured to generate a security error responsive to determining that the subsequent incoming server digital certificate of the impersonating server does not match the first persisted invalid server digital certificate identifier for the first server.

13. The system of claim 12 wherein:
the security checker is further configured to receive an indication that server digital certificate invalidity is to be ignored.

14. The system of claim 13 wherein:
the security checker is further configured to disallow ignoring server digital certificate invalidity for email servers appearing on an exception list.

15. The system of claim 12 wherein:
the saved digital certificate storage stores invalid server digital certificate identifiers by server name or email account.

16. The system of claim 12 wherein:
the security checker is further configured to inhibit syncing responsive to determining that the subsequent incoming server digital certificate of the impersonating server does not match the first persisted invalid server digital certificate identifier for the first server.

17. The system of claim 12 wherein:
the security checker is further configured to display an error message responsive to determining that the subsequent incoming server digital certificate of the impersonating server does not match the first persisted invalid server digital certificate identifier for the first server.

18. The system of claim 12 wherein the system further comprises:
validation logic configured to compare digital certificates during a sync process.

19. One or more computer-readable storage devices comprising computer-executable instructions for performing a method to establish identity of an email server, the method comprising:
during an initial sync of an email account with the email server, receiving a first digital certificate indicating an email server identity;
determining that the first digital certificate is invalid;
responsive to determining that the first digital certificate is invalid, presenting an option to ignore invalidity of the first digital certificate;

responsive to selection of the option to ignore invalidity of the first digital certificate, performing the following:

saving the invalid first digital certificate;

permitting configuration of the email account;

during subsequent communications with a computer impersonating the email server, receiving a subsequent digital certificate from the computer impersonating the email server;

checking whether the subsequent digital certificate received from the computer impersonating the email server matches the saved invalid first digital certificate; and responsive to determining that the subsequent digital certificate received from the computer impersonating the email server does not match the saved invalid first digital certificate, inhibiting further communication with the computer.

* * * * *